(12) United States Patent
Numaoka

(10) Patent No.: US 6,526,167 B1
(45) Date of Patent: Feb. 25, 2003

(54) IMAGE PROCESSING APPARATUS AND METHOD AND PROVISION MEDIUM

(75) Inventor: Chisato Numaoka, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/317,227

(22) Filed: May 24, 1999

(30) Foreign Application Priority Data

May 26, 1998 (JP) ............................................. 10-143746

(51) Int. Cl.[7] ................................................. G06K 9/80
(52) U.S. Cl. ........................ 382/157; 382/159; 382/165; 382/170
(58) Field of Search ................................ 382/103, 165, 382/170, 155–160, 199, 204, 206, 208, 215, 224, 225, 266, 272, 274, 288, 278, 294

(56) References Cited

U.S. PATENT DOCUMENTS

| 4,907,156 A | * | 3/1990 | Doi et al. | 364/413.13 |
| 5,257,182 A | * | 10/1993 | Luck et al. | 364/413.1 |
| 5,740,268 A | * | 4/1998 | Nishikawa et al. | 382/132 |
| 5,857,030 A | * | 1/1999 | Gaborski et al. | 382/132 |
| 5,956,080 A | * | 9/1999 | Tsunemine | 348/93 |
| 6,141,437 A | * | 10/2000 | Xu et al. | 382/130 |

FOREIGN PATENT DOCUMENTS

JP 08-287232 A * 11/1996 ............. G06T/1/00

OTHER PUBLICATIONS

Richard P. LIppmann, An Introduction to Computing with Neural Nets, IEEE ASSP Magazine, Apr. 1987, pp. 36–54.*

* cited by examiner

Primary Examiner—Brian Werner
(74) Attorney, Agent, or Firm—Frommer Lawrence & Haug LLP; William S. Frommer; Gordon Kessler

(57) ABSTRACT

An image processing apparatus and method and a provision medium arranged to perform image learning and image recognition in a short time. An image difference detector computes a differential image between an image stored in a frame buffer and an image stored in another frame buffer, and also computes the centroid of the differential image. A information collector forms RGB histogram data and binary data of a peripheral area about the centroid obtained by the image difference detector. A category former formed by a Kohonen network forms a category based on the RGB histogram data and binary data. A category statistic processor performs statistical processing of the categories output from the category former, and outputs a processing result to a learner formed by a recurrent neural network.

27 Claims, 19 Drawing Sheets

IMAGE MOVING DIRECTION

IMAGE PROCESSING APPARATUS AND METHOD AND PROVISION MEDIUM

BACKGROUND OF THE INVENTION

1. Field of the Invention

The present invention relates to an image processing apparatus and method and a provision medium and, more particularly, to an image processing apparatus and method and a provision medium arranged to perform real-time image recognition based on learning input image data in a short time.

2. Description of the Related Art

FIG. 15 illustrates the configuration of a conventional portable personal computer 200, which has a main body 201 and a lid portion 203 swingable relative to the main body 201 between open and closed states. A keyboard 202 is provided on the main body 201, and a liquid crystal display (LCD) 204 for displaying various sorts of information is provided on the lid portion 203.

The portable personal computer 200 can access a predetermined server to receive data of an image in three-dimensional virtual space and to display the image on the LCD 204.

As a user (or an avatar of the user) moves in a virtual space, an image in the three-dimensional virtual space changes according to the moving position of the user. To input the moving position in the virtual space, the user may operates the keyboard 202 or a mouse (not shown). However, such a position input method is disadvantageous in terms of operability and function.

The applicant of the present invention proposed, for example, in Japanese Patent Application 9-301095, a system in which a charge-coupled device (CCD) video camera 205 is attached to the lid portion 203 as shown in FIG. 15 to obtain an image on the back side of the LCD 204, the direction of the portable personal computer 200 is detected from a change in the image input by the CCD video camera 205, and virtual space image data is provided according to the detected direction.

If this proposed system is used, image data of a virtual space in a direction corresponding to the direction of the portable personal computer 200 can be displayed on the LCD 204 to enable a user to feel as a man in a virtual space and as if he or she recognizes an image when facing in a certain direction in the virtual space.

However, no method for computing the direction from the output of the CCD video camera 205 in a short time has been disclosed with respect to the above-described proposed system.

SUMMARY OF THE INVENTION

In view of the above-described circumstances, an object of the present invention is to provide an image processing apparatus and method in which the amount of computation for detecting the direction is reduced to detect the direction in a short time.

To achieve this object, according to the present invention, there is provided an image processing apparatus comprising computation means for computing a centroid of a differential image between input image data and image data obtained by changing the input image data so that the image represented by the input image data is shifted, collection means for collecting information of image data of a peripheral area about the centroid obtained by the computation means, forming means for forming a category from information collected by the collection means, and learning means for learning the category formed by the forming means.

According to another aspect of the present invention, there is provided an image processing method of processing input image data with an image processing apparatus, the method comprising a computation step of computing a centroid of a differential image between input image data and image data obtained by changing the input image data so that the image represented by the input image data is shifted, a collection step of collecting information of image data of a peripheral area about the centroid obtained in the computation step, a forming step of forming a category from information collected in the collection step, and a learning step of learning the category formed in the forming step.

According to still another object of the present invention, there is provided a provision medium used to provide a program to an image processing apparatus for processing input image data, the apparatus executing a process in accordance with the program, the process comprising a computation step of computing a centroid of a differential image between input image data and image data obtained by changing the input image data so that the image represented by the input image data is shifted, a collection step of collecting information of image data of a peripheral area about the centroid obtained in the computation step, a forming step of forming a category from information collected in the collection step, and a learning step of learning the category formed in the forming step.

In the above-described image forming apparatus, image forming method, and process enabled by the provision medium, a category is formed from data of an image area around the centroid of a differential image between input image data and image data obtained by changing the input image data so that the image represented by the input image data is shifted, and the formed category is learnt.

According to yet another aspect of the present invention, there is provided an image processing apparatus comprising computation means for computing a centroid of a differential image between input image data and image data obtained by changing the input image data so that the image represented by the input image data is shifted, collection means for collecting information of image data of a peripheral area about the centroid obtained by the computation means, category selection means for selecting a category from information collected by the collection means, and image selection means for selecting a stored image according to the category selected by the category selection means.

According to a further aspect of the present invention, there is provided an image processing method of processing input image data with an image processing apparatus, said method comprising a computation step of computing a centroid of a differential image between input image data and image data obtained by changing the input image data so that the image represented by the input image data is shifted, a collection step of collecting information of image data of a peripheral area about the centroid obtained in the computation step, a category selection step of selecting a category from information collected in the collection step, and an image selection step of selecting a stored image according to the category selected in the category selection step.

According to still a further aspect of the present invention, there is provided a provision medium used to provide a program to an image processing apparatus for processing input image data, said apparatus executing a process in accordance with the program, the process comprising a computation step of computing a centroid of a differential image between input image data and image data obtained by changing the input image data so that the image represented by the input image data is shifted, a collection step of collecting information of image data of a peripheral area about the centroid obtained in said computation step, a category selection step of selecting a category from information collected in said collection step, and an image selection step of selecting a stored image according to the category selected!in said category selection step.

In the above-described image forming apparatus, image forming method, and process enabled by the provision medium, a category is formed from data of an image area around the centroid of a differential image between input image data and image data obtained by changing the input image data so that the image represented by the input image data is shifted, and a stored image can be selected based on the recognized category.

DESCRIPTION OF THE PREFERRED EMBODIMENT

Figure 15:
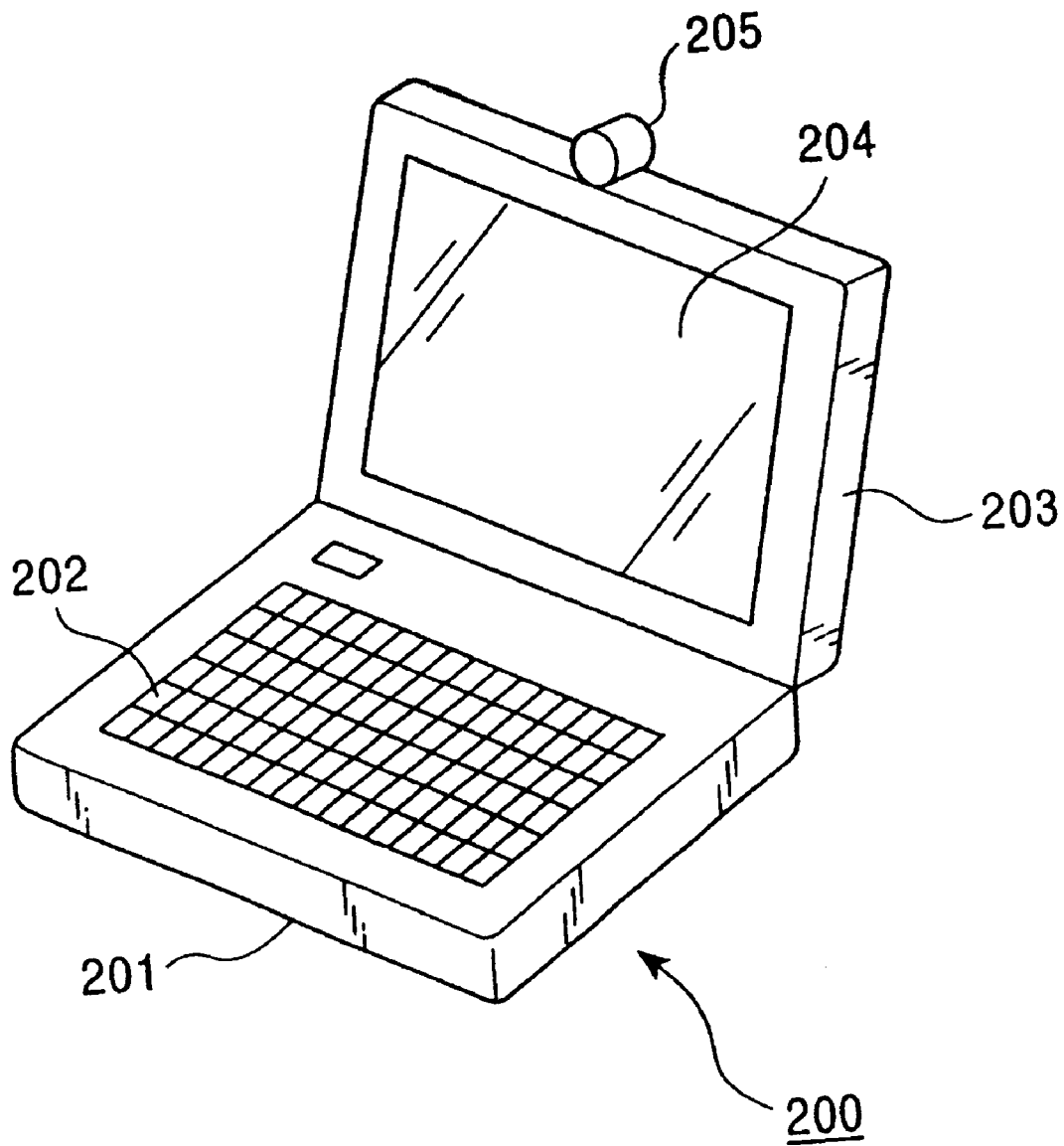
FIG. 15 is a perspective view of the construction of a conventional portable personal computer.

An embodiment-of the present invention will be described below with reference to the accompanying drawings. An image processing apparatus in accordance with the present invention has the same external appearance as that of the portable personal computer 200 shown in FIG. 15, but has essential components arranged as shown in the functional block diagram of FIG. 1 to execute a program under the control a central processing unit (CPU).

Figure 1:
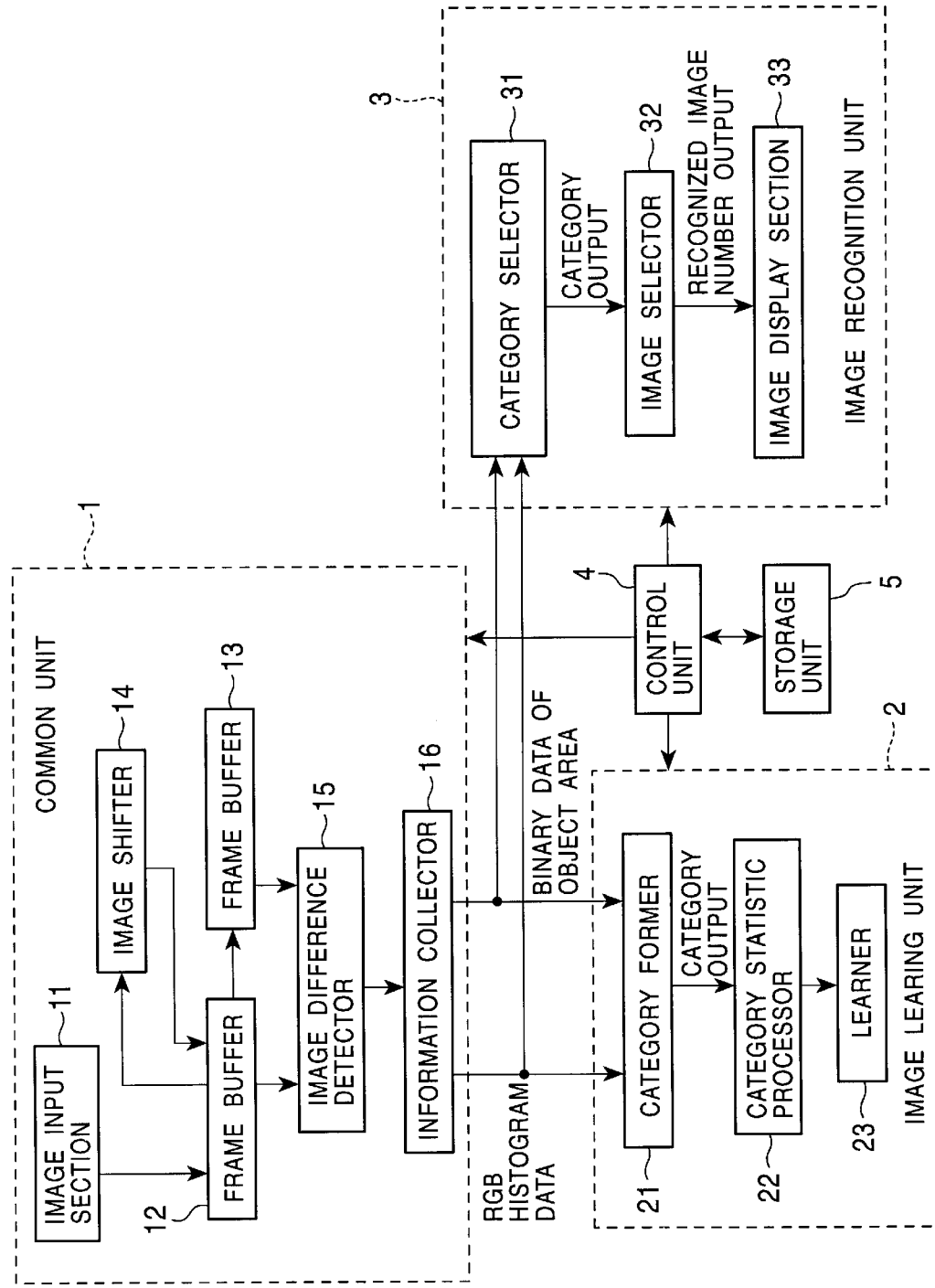
FIG. 1 is a block diagram showing functions of an image processing apparatus in accordance with the present invention.

As shown in FIG. 1, the image processing apparatus has a common unit 1, an image learning unit 2, an image recognition unit 3, a control unit 4, and a storage unit 5. The common unit 1 is used to perform an image learning process as well as an image recognition process. The image learning unit 2 is a unit for performing the image learning process, and the image recognition unit 3 is a section for performing the image recognition process. The control unit 4 controls the common unit 1, the image learning unit 2 and the image recognition unit 3. The storage unit 5 is constituted by, for example, a hard disk or a removable medium such as a compact disk recordable (CD-R), and stores image data as a file.

An image input section 11 of the common unit 1 is formed by a CCD video camera 205 and a file reader (not shown). When the apparatus operates to perform image learning, the file reader for reading a file from the storage unit 5 is used. When the apparatus operates to perform image recognition, the CCD video camera 205 is used.

An image shifter 14 shifts an image stored in a frame buffer 12 by a certain distance in a certain direction at certain intervals. The image shifter 14 stores the shifted image in the frame buffer 12. The image data stored in the frame buffer 12 is transferred to and stored in a frame buffer 13. An image difference detector 15 compares pixel values of the image stored in the frame buffer 12 and the image stored in the frame buffer 13, determines the changed pixels, and computes the position of the pixel corresponding to the centroid of the changed pixels by computing the arithmetic means of the values of all the changed pixels. The image difference detector 15 outputs the coordinates of the centroid to an information collector 16.

The information collector 16 extracts data of peripheral pixels about the centroid position supplied from the image difference detector 15, and forms red, green and blue (RGB) histogram data of the extracted pixel data. The information collector 16 also executes the process of extracting only red components from the peripheral pixel data, binarizing the extracted data based on a predetermined threshold value, and discretizing the binarized data. The RGB histogram data and the binarized data are supplied to a category former. 21 of the image learning unit 2 and to a category selector 31 of the image recognition unit 3.

Figure 2:
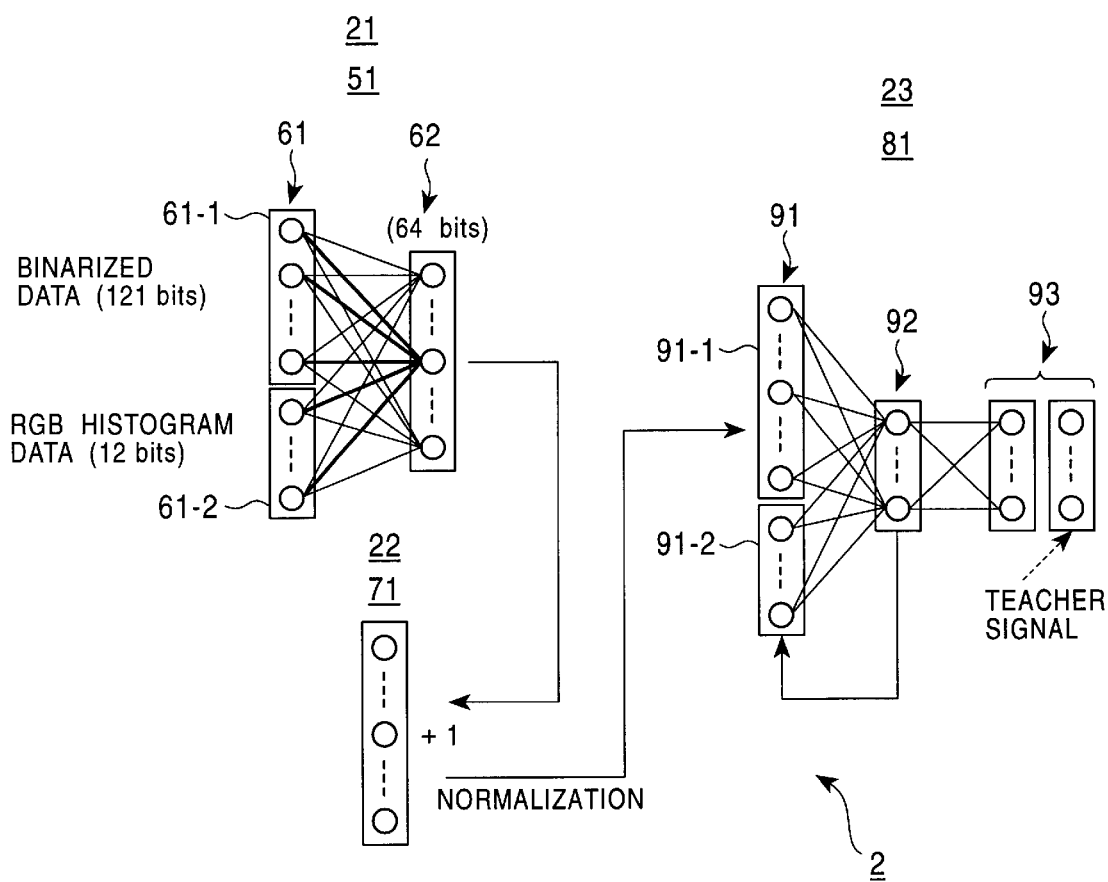
FIG. 2 is a block diagram of the configuration of an example of the image learning unit shown in FIG. 1.

The category former 21 of the image learning unit 2 is formed by, for example, a Kohonen network 51 such as shown in FIG. 2. The example of Kohonen network 51 shown in FIG. 2 is formed of an input layer 61 and an output layer 62. The input layer 61 comprises two input layers 61-1 and 61-2. In this example, 121-bit binarized data is input to the input layer 61-1 from the information collector 16, and 12-bit RGB histogram data is input to the input layer 61-2 from the information collector 16. Kohonen network 51 multiplies the input data items by predetermined coefficients and adds together the multiplied data items to output a 64-bit category from the output layer 62.

A category statistic processor 22 has a wins counter 71, as shown in FIG. 2. The wins counter 71 has nodes corresponding to nodes in the output layer 62 of Kohonen network 51. When one of the nodes in the output layer 62 is selected as a winner, the value of the corresponding node of the wins counter 71 is incremented by 1. The wins counter 71 also normalizes the values of the winner counter array so that the sum of the counter values is 1, and outputs the normalized values to a learner 23.

The learner 23 is formed by, for example, a recurrent neural network 81, as shown in FIG. 2. The example of recurrent neural network 81 shown in FIG. 2 is formed of an input layer 91, a hidden layer 92, and an output layer 93. The input layer 91 comprises two input layers 91-1 and 91-2. Sixty four bits output from the wins counter 71 are respectively input to nodes in the input-layer 91-2, and eight bits output from the hidden layer 92 are respectively input to nodes in the input layer 91-2. The output layer 93 has the same number of nodes as the number of images. Each of nodes in the output layer 93 corresponds to an image number. Learning is performed in a back propagation manner so that an error between the value of each node in the output layer 93 and a teacher signal (image number) is reduced.

Figure 3:
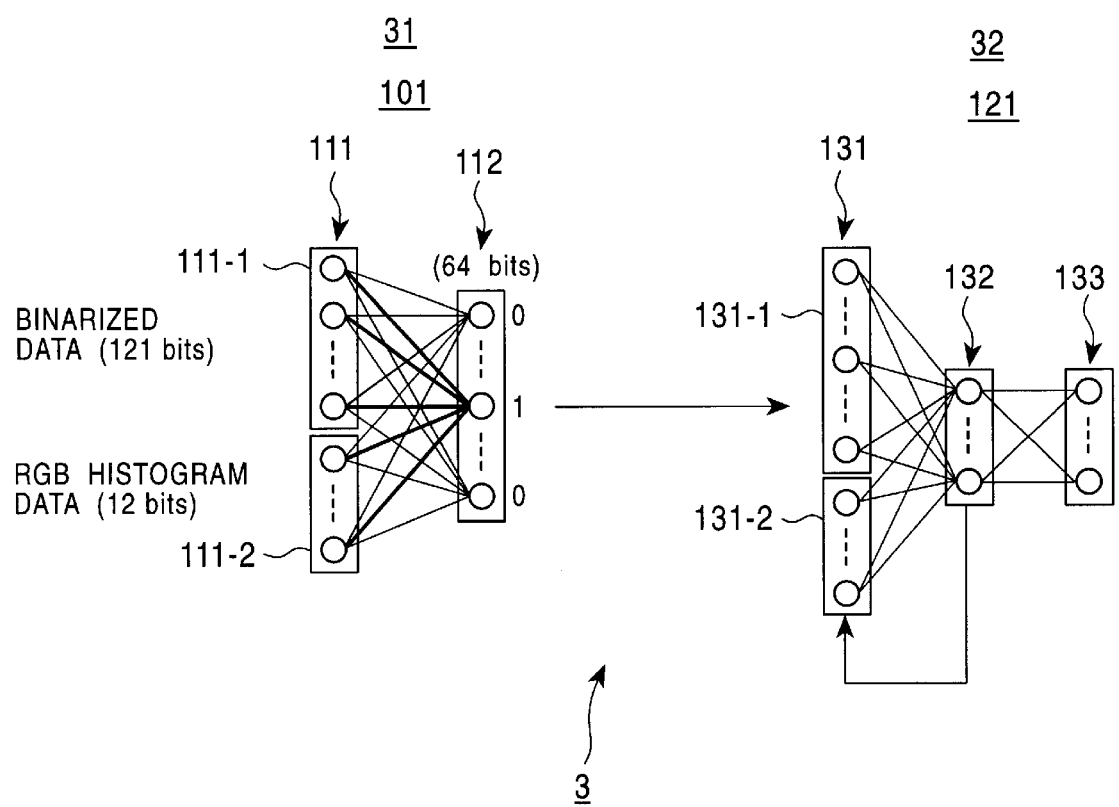
FIG. 3 is a block diagram of the configuration of an example of the image recognition unit shown in FIG. 1.

The category selector 31 of the image recognition unit 3 is formed by a Kohonen network 101, as shown in FIG. 3. This Kohonen network 101 is formed of an input layer 111 comprising two input layers 111-1 and 111-2, and an output layer 112. Kohonen network 101 forming the category selector 31 corresponds to Kohonen network 51 forming the category former 21 shown in FIG. 2, and these two Kohonen networks are substantially identical to each other. That is, a network obtained as a result of the predetermined learning process performed by Kohonen network 51 of the category former 21 is Kohonen network 101, which selects a category from input data and outputs the selected category to the image selector 32.

The image selector 32 is formed by a recurrent neural network 121, as shown in FIG. 3. The recurrent neural network 121 is formed of an input layer 131 comprising two input layers 131-1 and 131-2, a hidden layer 132, and an output layer 133. This recurrent neural network 121 also corresponds to recurrent neural network 81 of the image learner 23, and these recurrent neural networks are substantially identical to each other. That is, a network obtained as a result of learning performed by recurrent neural network 81 of the learner 23 is recurrent neural network 101 of the image selector 32.

As shown in FIG. 3, the output of Kohonen network 101 is directly input to recurrent neural network 121, while the output of the Kohonen network 51 at the time of learning is input to the recurrent neural network 81 via the wins counter 71. The output from the output layer 112 of Kohonen network 101 is controlled so that only the winner node is 1 and the other nodes are 0.

Recurrent neural network 121 of the image selector 32 is arranged so that, if the greatest one of the output values of the nodes in the output layer 133 exceeds a predetermined threshold value, the corresponding number is output as a recognized image number to an image display section 33.

The image display section 33 receives the recognized image number supplied from the image selector 32, makes a virtual display section display the corresponding image, and actually displays the image on an LCD 204 if necessary.

The operation of the apparatus shown in FIG. 1 when the apparatus performs the image learning process will now be described with reference to the flowchart of FIG. 4. First, in step S1, a variable c representing the number of learning times is initialized to "1". In step S2, a variable L representing the number of processed images is initialized to "0". In step S2, a determination is made as to whether the variable L is smaller than the number of images to be learnt. The result of determination is YES in this initial stage, and the process advances to step S3, in which the image input section 11 reads out Lth image file from the storage unit 5 via the control unit 4, extracts image data corresponding to the frame buffer 12 size from the read image file, and supplies the extracted image data to the frame buffer 12 to store the date in the same.

In step S4, a variable N representing the number of category learning repeat times is initialized to "1" and a determination is made as to whether the variable N is equal to or smaller than a preset number of category learning repeat times. In this initial stage, N=1 and it is determined that N is smaller than the preset number of repeat times. The process then advances to step S7 and a category learning process is executed, as described below in detail with reference to the flowchart of FIG. 5.

In step S21 of the category learning process, the image difference detector 15 computes the differences between pixel values stored in the frame buffer 12 and pixel values stored in the frame buffer 13, determines changed pixels, and computes the position of the pixel corresponding to the centroid of the changed pixels by computing the arithmetic means of the values of all the changed pixels. The centroid coordinates are set as (cgX, cgY). Black-pixel data is stored in the frame buffer 13 in the initial state. The centroid coordinates are output from the image difference detector 15 to the information collector 16.

In step S22, the information collector 16 performs processing for extracting data of pixels in a peripheral area about the centroid coordinates (cgx, cgY) supplied from the image difference detector 15. That is, the information collector 16 sets a peripheral area containing d×d pixels about the centroid coordinates (cgX, cgY), extracts the corresponding pixel data, and stores the extracted data in a two-dimensional array "field".

In step S23, the information collector 16 performs color histogram collection processing. That is, the information collector 16 forms a histogram of each of red, green and blue in the peripheral area. For example, if the level of each color is represented by one of 0 to 255, a red (R) histogram showing the number of pixels having each of the levels 0 to 255 is formed. Similarly, a green (G) histogram and a blue (B) histogram showing the number of pixels having each of the levels 0 to 255 are formed.

Further, the information collector 16 selects one of color numbers (level numbers) corresponding to the peak value in the R histogram, and computes the quotient of division of the selected color number by 16. The information collector 16 also computes the quotient of division by 16 of the color number corresponding to the peak value in each of the G and B histograms. Data consisting of the set of three values (hereinafter referred to as RGB histogram data) is thereby obtained.

Figure 6:
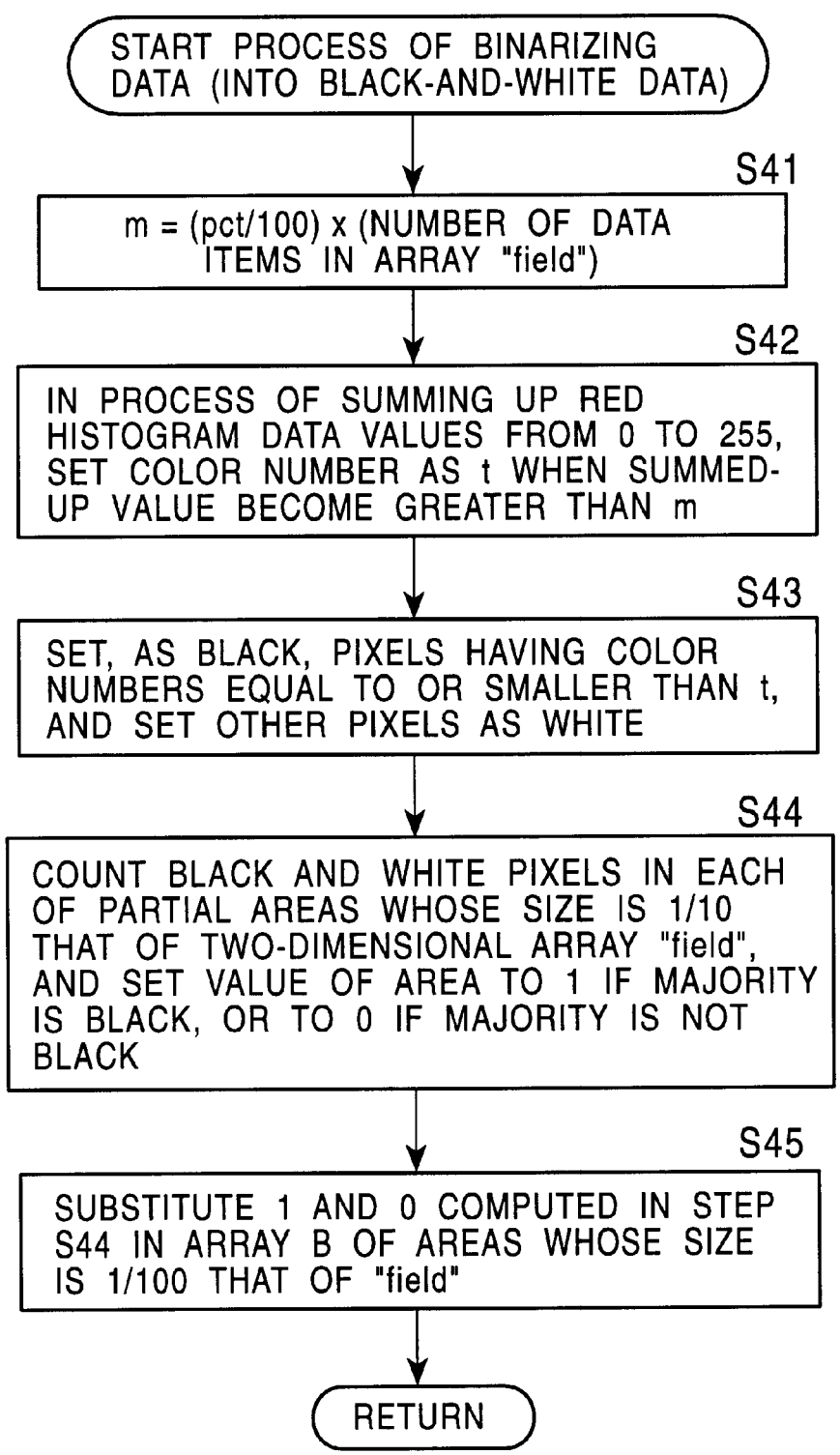
FIG. 6 is a flowchart of binarization of data in step S24 of FIG. 5.

After RGB histogram data has been obtained by the above-described processing, the information collector 16 performs, in step S24, the process of binarizing the data (into black-and-white data), as described below in detail with reference to FIG. 6.

First, in step S41 of the binarization process, the information collector 16 computes, by an equation shown below, a value m which is a threshold value for binarization.

m=(pct/100)×(the number of data items in array "field")

where pct is the proportion of black pixel data in the peripheral area pixel data.

In step S42, the information collector 16 performs computation of successively summing up the values of the R histogram, and sets the color number as "t" when the summed-up value exceeds the value m obtained in step S41.

In step S43, the information collector 16 performs processing for binarizing the R pixels into black and white pixels in such a manner that the pixels having color numbers equal to or smaller than the value t computed in step S42 are set as black pixels while the other pixels having color numbers greater than t are set as white pixels.

In step S44, the information collector 16 divides the size of the two-dimensional array by 10 in each of the vertical and horizontal directions to separate the pixels in the peripheral area into groups in 10×10 partial areas. The information collector 16 counts the number of white pixels and the number of black pixels in each partial area. The information collector 16 sets the value of each partial area to 1 if the number of black pixels is greater than the number of white pixels, or to 0 if the number of black pixels is not greater than the number of white pixels. Discrete binarized data of the peripheral is thereby obtained. In step S45, the information collector 16 substitutes 1 and 0 computed in step S44 in an array B of areas the size of which is 1/100 that of the peripheral area.

Figure 5:
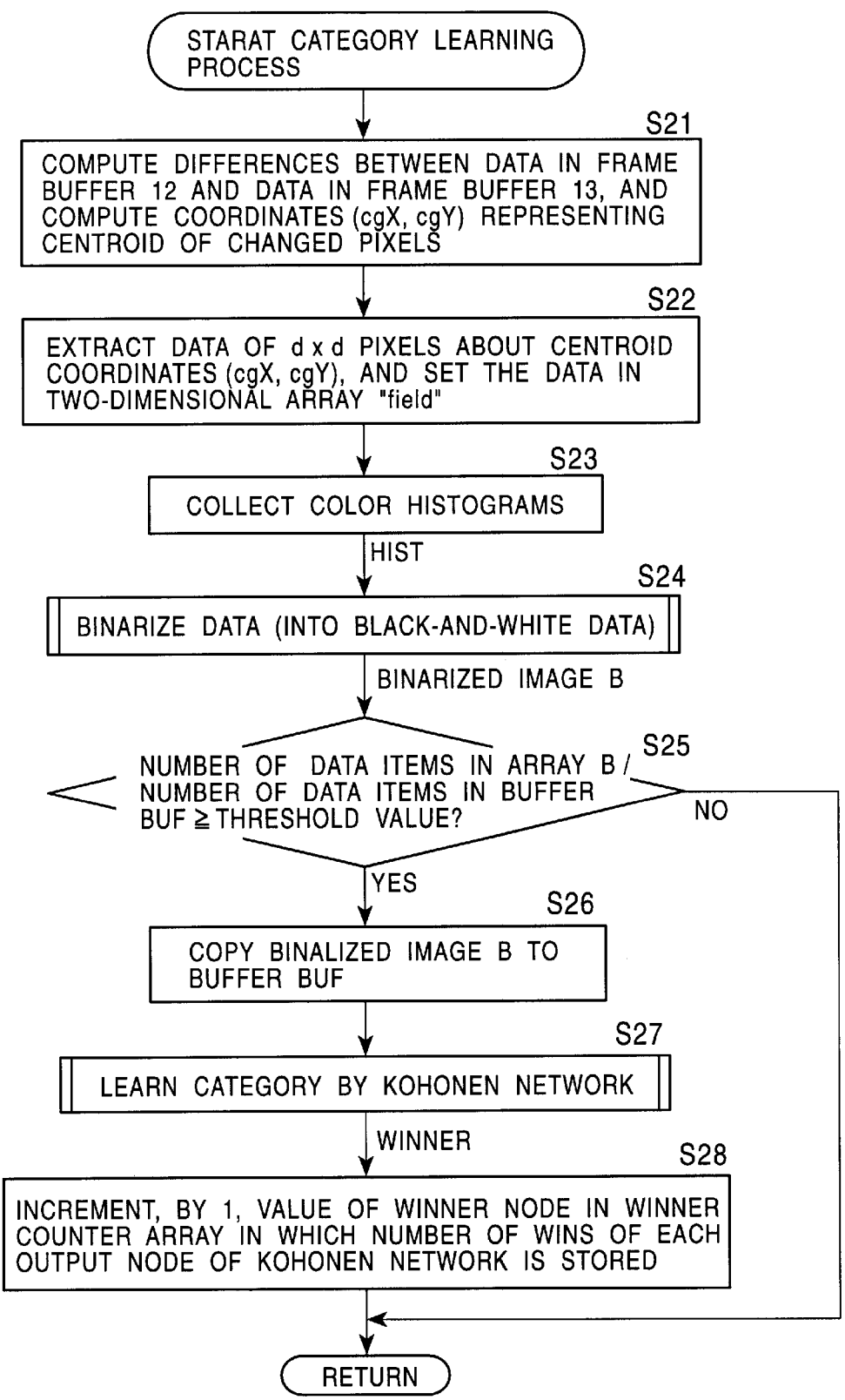
FIG. 5 is a flowchart of category learning in step S7 of FIG. 4.

After the above-described binarization process, the information processor 16 makes a determination in step S25 shown in FIG. 5 as to whether the value which is the quotient of division of the number of data items in array B generated in step S45 by the number of data items in an internal buffer BUF of the information collector 16 is equal to or greater than a predetermined threshold value. The number of data items in the buffer BUF is the number of data items in array B of the peripheral area one frame before, which was stored by processing in step S26 of image data of the preceding frame image data. If the quotient is equal to or greater than the threshold value, that is, the number of data items in array B is sufficiently large, the information collector 16 copies, in step S26, the data in array B obtained in step S45 to its internal buffer.

The RGB histogram data formed in step S23 by the information collector 16 and the binary data copied to the buffer in step S26 by the information collector 16 are supplied to the category former 21 of the image learning unit 2. In step S27, the category former 21 performs category learning by the Kohonen network.

Figure 7:
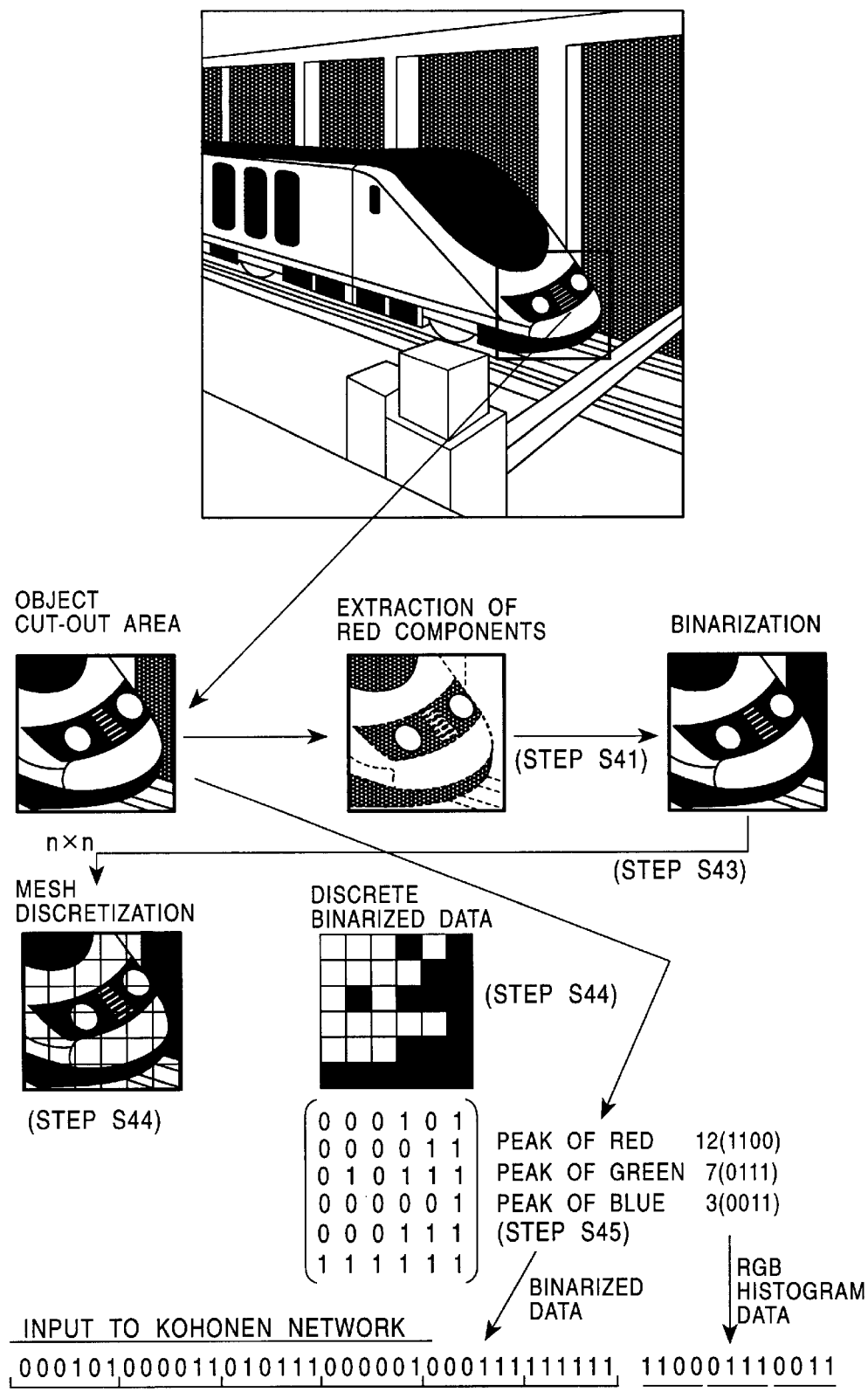
FIG. 7 is a diagram for explaining steps S21 to S26 of FIG. 5.

The above-described process will be further described by way of example with reference to FIG. 7. The image difference detector 15 computes the centroid of the differential image, and the information collector 16 then cuts out the peripheral area about the centroid and forms RGB histogram data of pixels in the peripheral area. In the example shown in FIG. 7, RGB histogram data (12, 7, 3) is formed. In binary notation, this RGB histogram data is 110001110011.

The information collector 16 extracts R histogram data of the peripheral area in step S42, and binarizes the R components based on the predetermined threshold value in step S43. In step S44, the information collector 16 separates (mesh-discretizes) the binarized data into groups in 10×10 partial areas (6×6 groups in the case of the example shown in FIG. 7), and assigns 1 and 0 to the areas according to the number of white pixels and the number of black pixels, thereby forming discrete binarized data. In step S45, the information collector 16 substitutes the discrete binarized data in array B.

Figure 8:
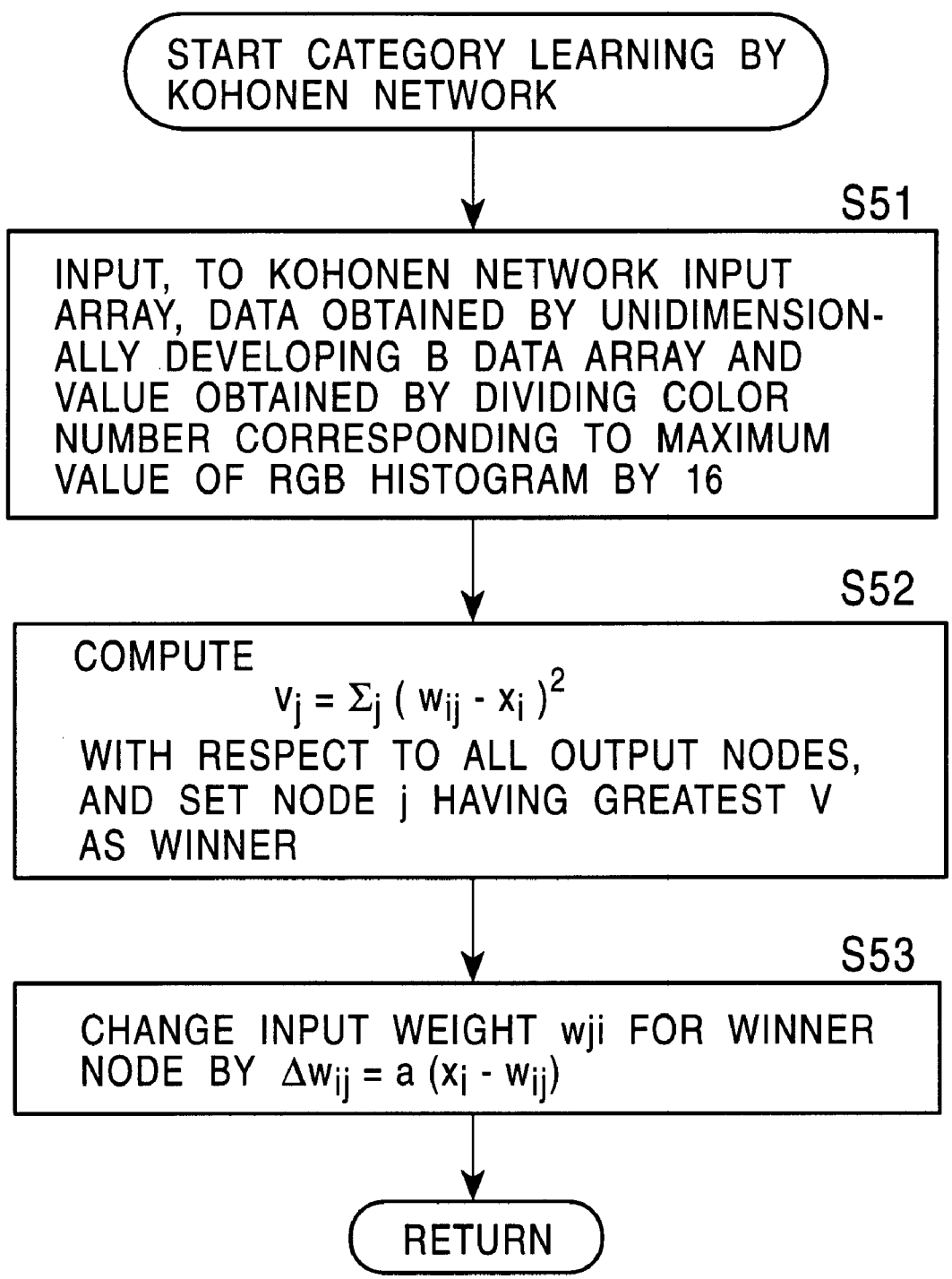
FIG. 8 is a flowchart of category learning by a Kohonen network in step S27 of FIG. 5.

FIG. 8 shows details of category learning in step S27 using the Kohonen network. In step S51 shown in FIG. 8, data obtained by unidimensionally developing the data in array B formed in step S45 is input from the information collector 16 to the input layer 61-1 of Kohonen network 51 of the category former 21. Also, the quotient of division by 16 of the color number corresponding to the maximum value of RGB histogram data formed in step S23 by the information collector 16 is input to the input layer 61-2 of Kohonen network 51.

In step S52, Kohonen network 51 performs calculation by the following equation:

$$v_j = \Sigma_i (w_{ij} - x_i)^2$$

with respect to all the output nodes of the output layer 62.

In the output layer 62, node j having the maximum value of v obtained by the above equation is set as a winner.

In step S53, Kohonen network 51 changes weight coefficient $w_{ij}$ for the input corresponding to the winner node at the following rate:

$$\Delta w_{ij} = a(x_i - w_{ij})$$

To be accurate, processing shown by the following equation is performed.

$$w_{ij}(t+1) = w_{ij}(t) + d(x_i - w_{ij}(t))$$

After a winner has been determined by Kohonen network 51 in the above-described manner, it is supplied to the wins counter 71 of the category statistic processor 22. The wins counter 71 increments the value of the winner node by 1 in step S28.

If it is determined in step S25 that the value which is the quotient of division of the number of data items in array B by the number of data items in the buffer BUF is smaller than the predetermined threshold value, steps S26 to S28 are skipped. In this case, processing in these steps is not performed because the amount of data in array B is insufficient.

Figure 4:
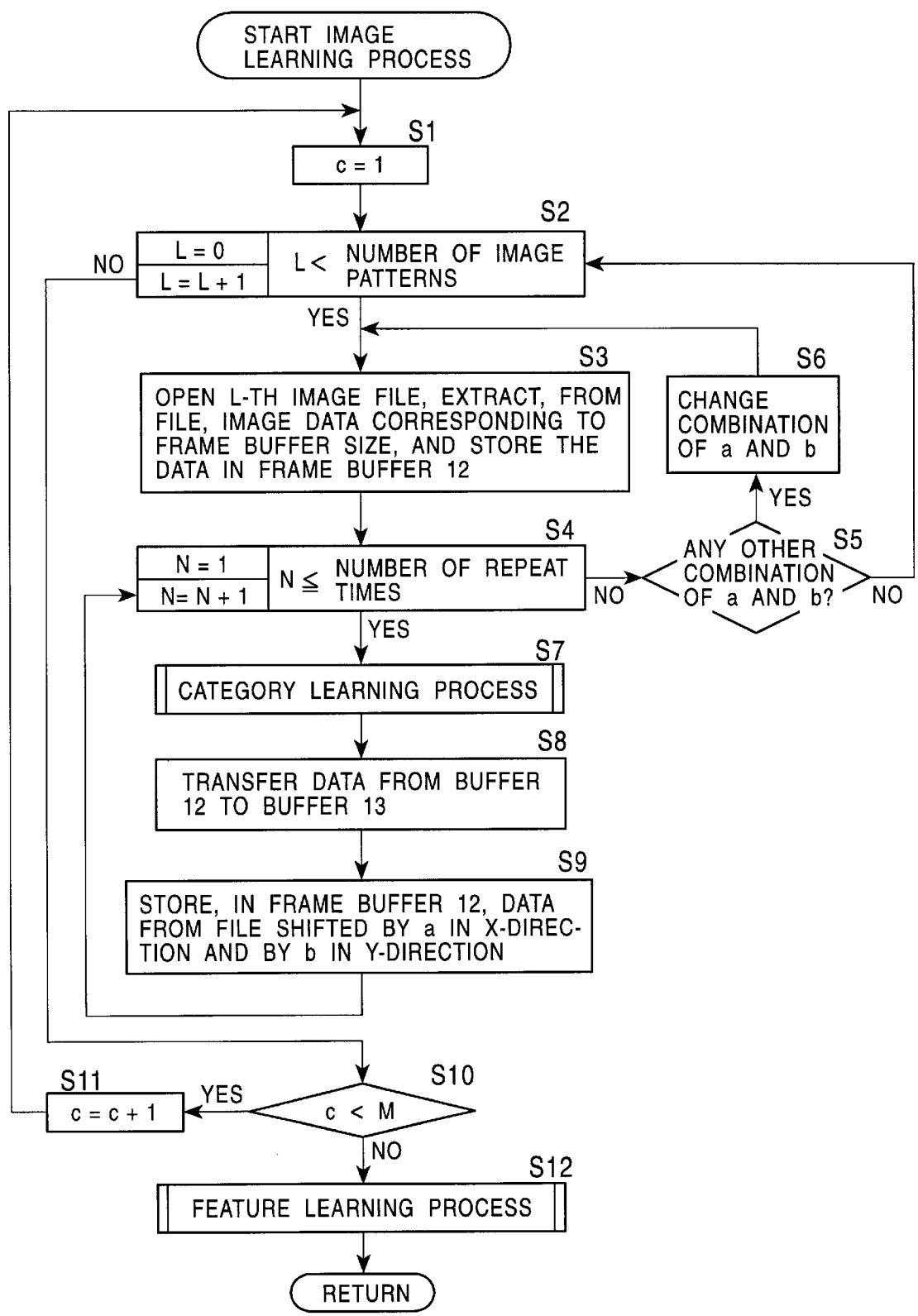
FIG. 4 is a flowchart of an image learning process performed by the apparatus shown in FIG. 1.

Referring to FIG. 4, after execution of the category learning process in step S7 described above, the image shifter 14 transfers image data from the frame buffer 12 to the frame buffer 13 in step S8. In step S9, the image shifter 14 makes the image input section 11 read out, from the file in the storage unit 5, image data corresponding to the image data stored in the frame buffer 12 and shifted by an amount "a" in X-direction and by an amount "b" in Y-direction, and stores the read data in the frame buffer 12.

Figure 9:
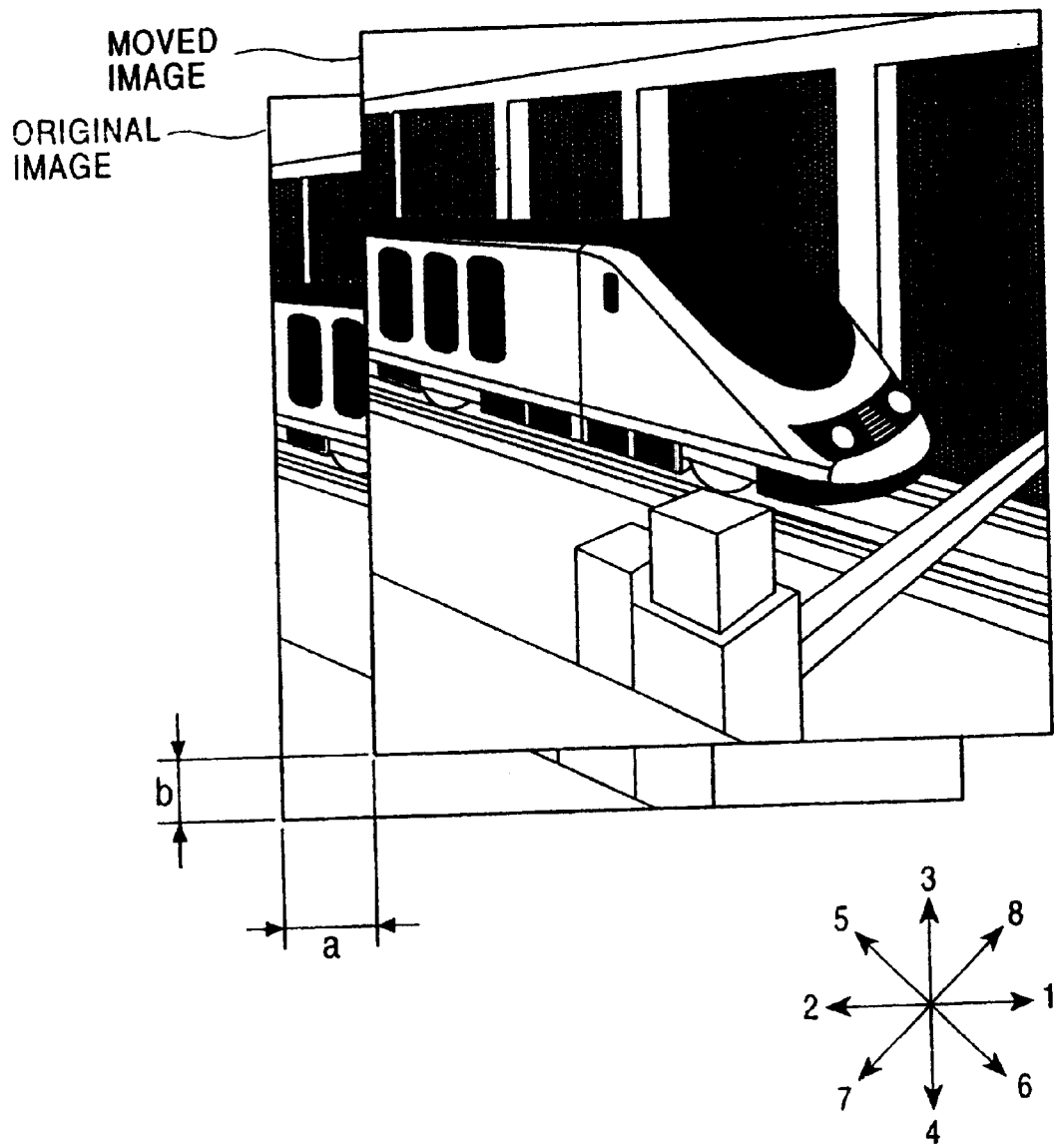
FIG. 9 is a diagram for explaining step S9 of FIG. 4.

For example, image data shifted in one of eight directions 1 to 8 shown in FIG. 9 is written to the frame buffer 12. One of the eight directions is determined, for example, by setting the value "a" to one of −4, 0 and +4 and the value "b" to one of −4, 0 and +4. If no data is read for some of the pixels, black pixel data is written for the pixels with no read data.

The process then returns to step S4, the variable N representing the number of category learning times is incremented by 1, and a determination is made as to whether the variable N is equal to or smaller than the preset number of repeat times. If the variable N is equal to or smaller than the number of repeat times, the process advances to step S7 and the subsequent processings are performed as described above. If it is determined in step S4 that the variable N has become greater than the preset number of repeat times, the process advances to step S5 and the image shifter 14 makes a determination as to whether there is another combination of shift "a" in X-direction and shift "b" in Y-direction of data in step S9 (in other words, whether the image is to be shifted in a direction other than the direction determined by the previously-set combination of "a" and "b". If there is another combination of "a" and "b", the process advances to step S6 and this combination of shifts "a" and "b" is substituted for the former combination. The process then returns to step S3 and the subsequent processings are repeated.

If it is determined in step S6 that there is no other combination of shifts "a" and "b", the process returns to step S2, the variable representing the number of image patterns used for learning is incremented by 1, and a determination is made as to whether the variable L has become equal to-or greater than the number of prepared image patterns. If the variable L is smaller than the number of image patterns, the process advances to step S3 and the same processings as those described above are repeated.

If it is determined in step S2 that the variable L has become equal to or greater than the number of prepared image patterns, the process advances to step S10 and the control unit 4 makes a determination as to whether the variable c representing the number of image learning times is smaller than the value M representing the number of times by which learning by Kohonen network 51 converges. If the variable c is smaller than the value M, that if learning by Kohonen network 51 has not converged yet, the process advances to step S11 and the variable c is incremented by 1. The process then returns to step S2 and the subsequent processings are repeated.

Figure 10:
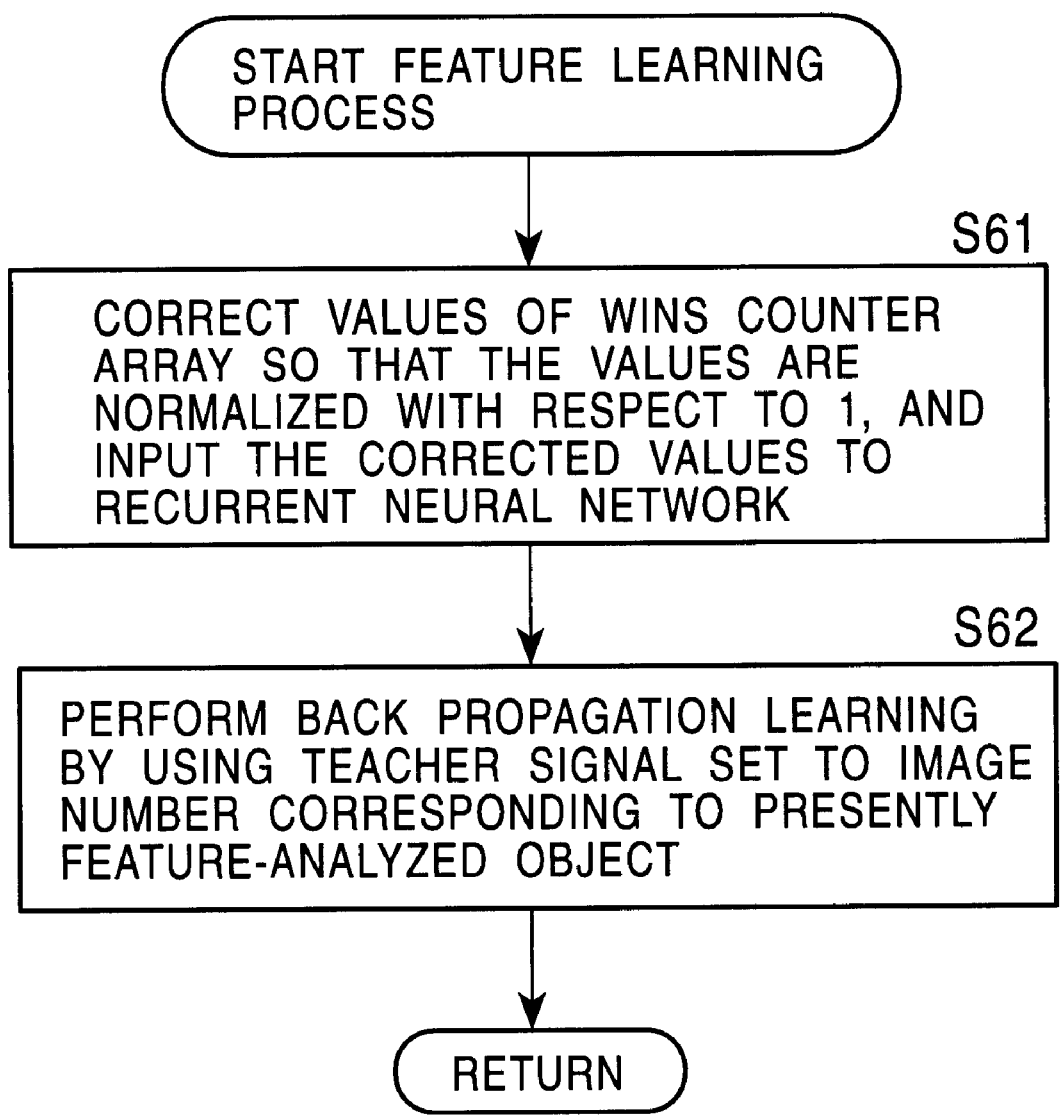
FIG. 10 is a flowchart of feature learning in step S12 of FIG. 4.

If it is determined in step S10 that the variable c has become equal to or greater than the value M, that is, learning by Kohonen network 51 has been performed a number of times such that the coefficients obtained by learning converge, the process advances to step S12 and a feature learning process, is executed, as described below in detail with reference to FIG. 10.

First, in step S61 of the feature learning process, the category statistic processor 22 normalizes the values of the array in the wins counter 71 with respect to 1, and outputs the normalized value to the input-layer 91-1 of recurrent neural network 81 of the learner 23.

With recurrent neural network 81, back propagation learning is performed by setting the teacher signal to the image number corresponding to the presently feature-analyzed object.

Figure 11:
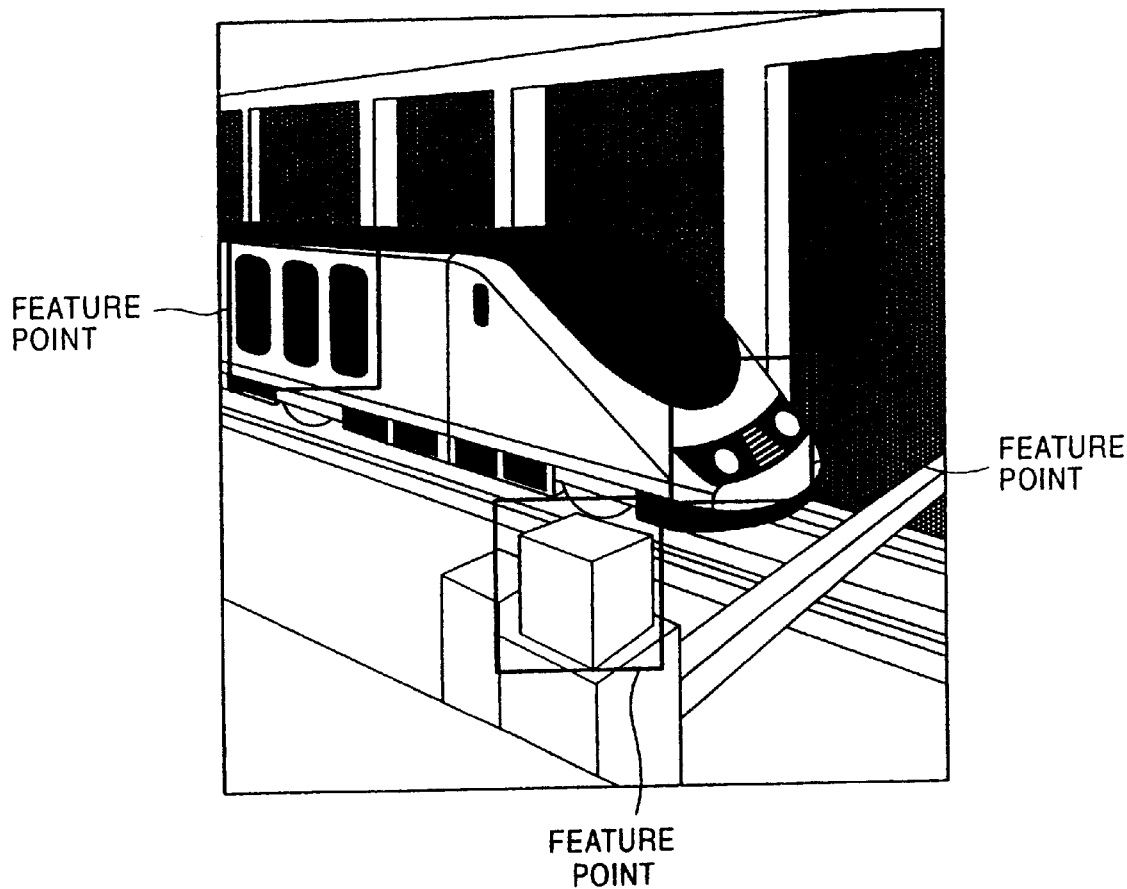
FIG. 11 is a diagram for explaining the process shown in FIG. 10.

In the above-described manner, plurality-to-one mapping from feature points of peripheral areas about a plurality of centroids such as shown in FIG. 11 to a category is learnt by Kohonen network 51. Also, mapping from a statistical set of categories to image numbers is learnt by recurrent neural network 81.

Figure 12:
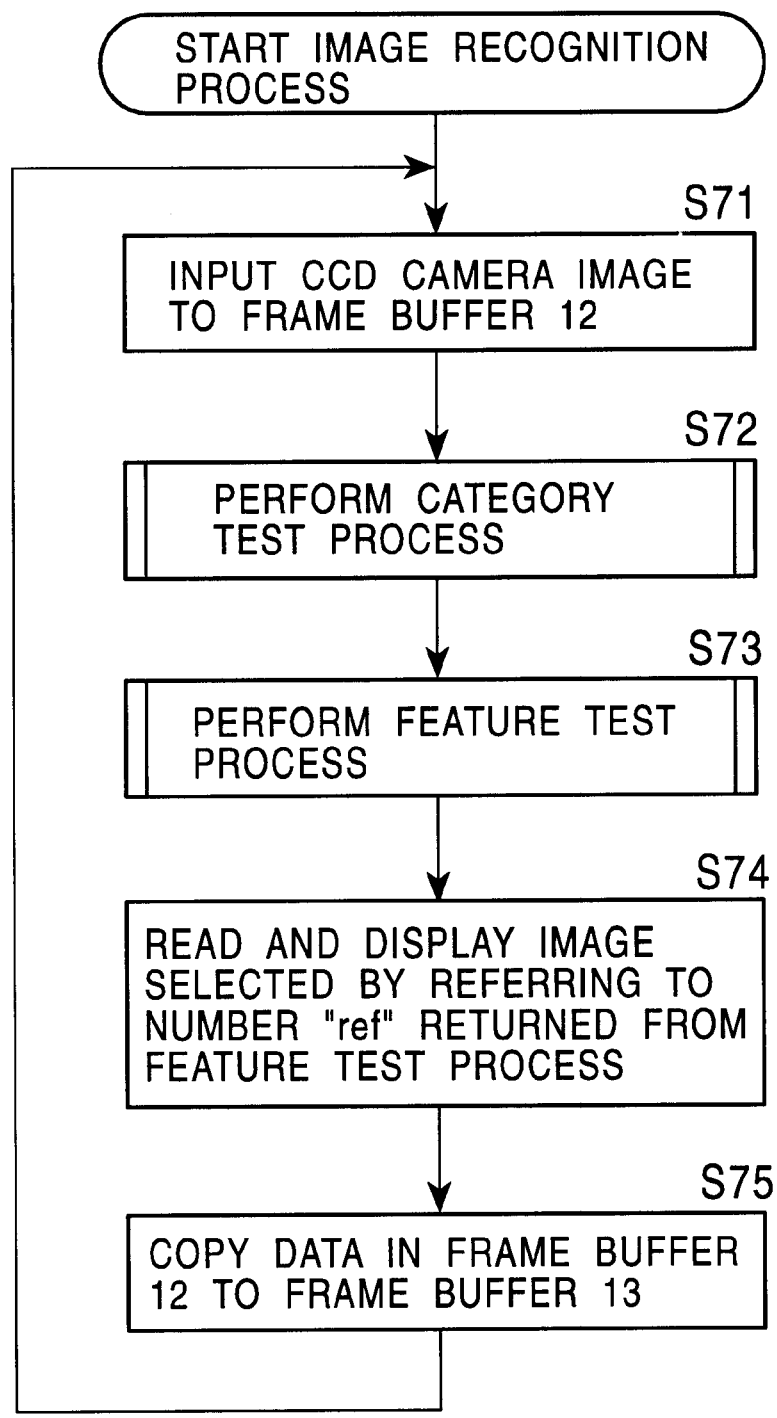
FIG. 12 is a flowchart of an image recognition process performed by the apparatus shown in FIG. 1.

After the learning process has been performed as described above, the image recognition process can be performed, as shown in the flowchart of FIG. 12. First, in step S71, image data output from the CCD video camera 205 of the image input section 11 is supplied to and stored in the frame buffer 12. Next, in step S72, a category test process is executed, as described below in detail with reference to FIG. 13.

Figure 13:
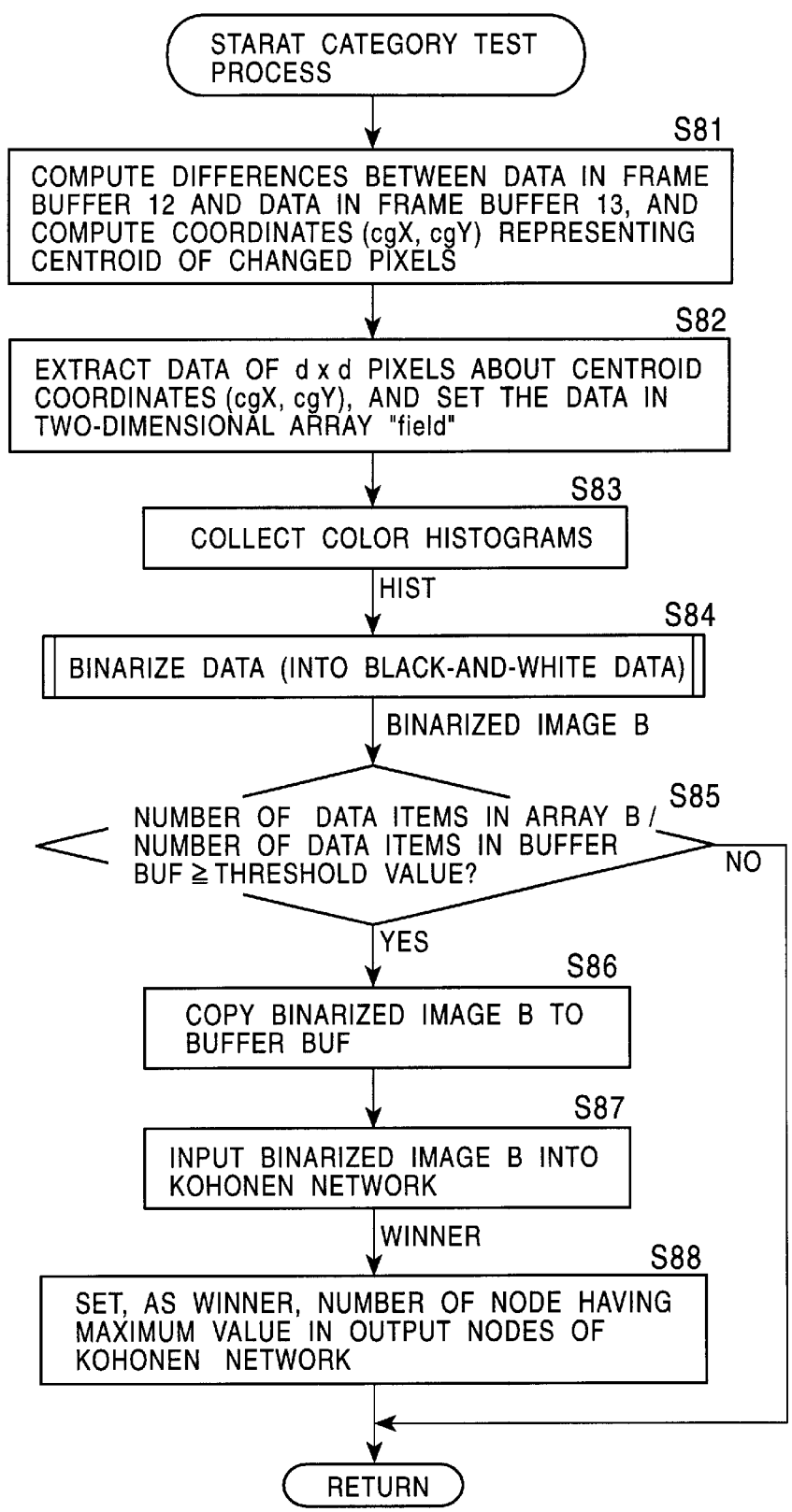
FIG. 13 is a flowchart of a category test in step S72 of FIG. 12.

Steps S81 to S86 in steps S81 to S88 of the process shown in the flowchart of FIG. 13 are basically the same as steps S21 to S26 shown in FIG. 5.

That is, in step S81, the image difference detector 15 computes the differences between data in the frame buffer 12 and data in the frame buffer 13, computes the coordinates of the centroid of the differential image, and sets the centroid coordinates as (cgX, cgY). The centroid coordinates are supplied to the information collector 16. In step S82, the information collector 16 extracts data of a peripheral area corresponding to d×d pixels about the centroid coordinates (cgx, cgY), and sets the data in a two-dimensional array "field". The information collector 16 forms color histograms in step S83, and binarizes the data in step S84.

The data binarized in step S84 is divided by the number of data items in the buffer BUF in step S85. If the quotient of this division is equal to or greater than the predetermined threshold value, the process advances to step S86 and the image data in array B is copied to the buffer.

In step S87, RGB histogram data formed in step S83 by the information collector 16 is input to the input layer 111-2 of Kohonen network 101 while the binarized data of the peripheral area copied to the buffer in step S86 is read out from the buffer and input to the input layer 111-1 of Kohonen network 101. As described above, categories have been learnt by Kohonen network 101 (Kohonen network 51), and Kohonen network 101 multiplies the data input to the input layer 111 by coefficient $w_{ij}$ and outputs, as a winner, the number of one of the output nodes having the maximum value. That is, a category is selected from the image data input to Kohonen network 101.

In step S85, if the quotient of division of the number of binarized image data items formed in step S84 by the number of data items in the buffer BUF is smaller than the predetermined threshold value, steps S86 to S88 are skipped.

Figure 14:
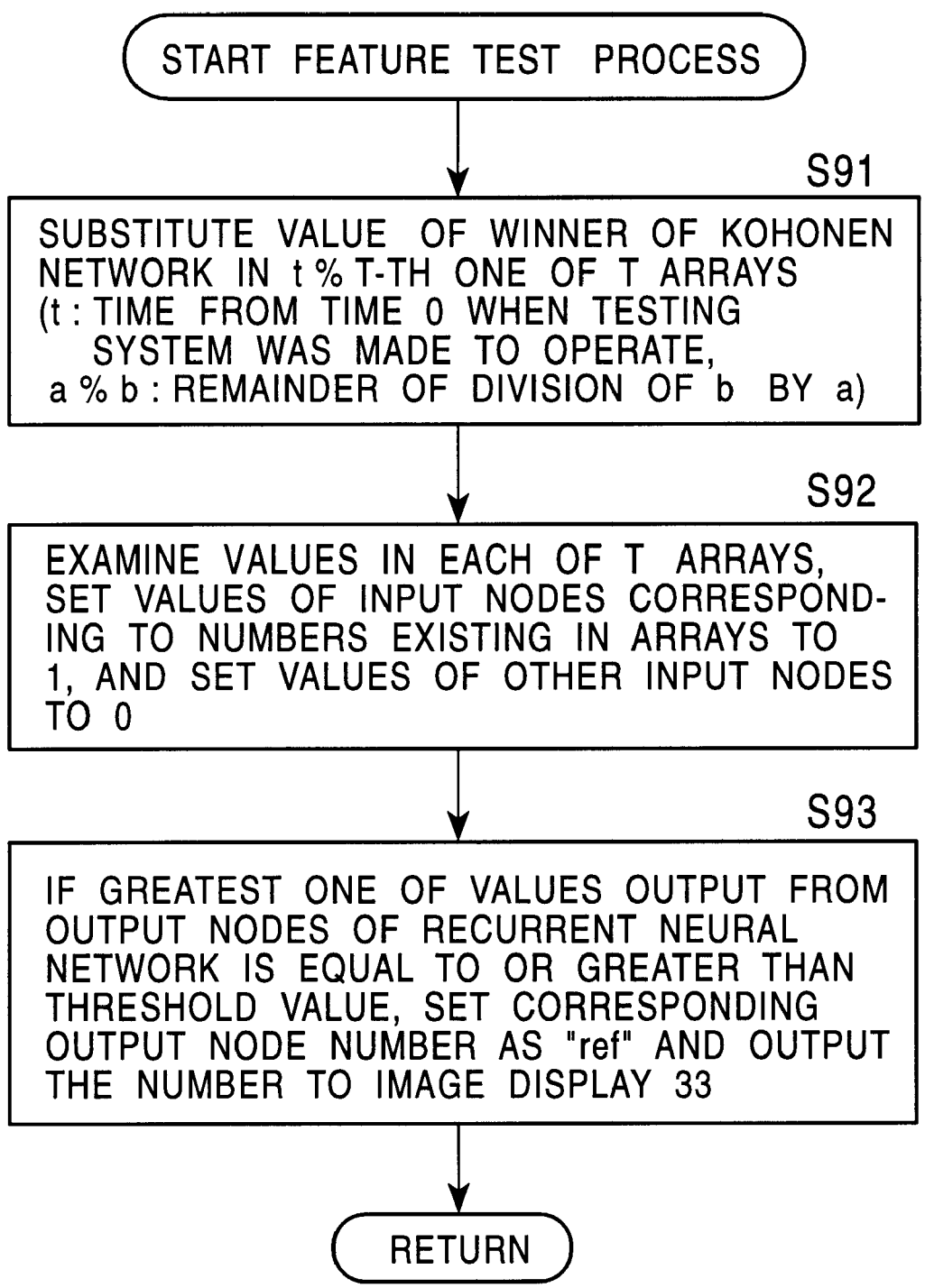
FIG. 14 is a flowchart of a feature test in step S73 of FIG. 12.

After the completion of the category test process performed as described above in step S72 shown in FIG. 12, the process advances to step S73 and a feature test process is executed, as described below in detail with reference to FIG. 14.

First, in step S91, the value of the winner in Kohonen network 101 is substituted in the t %Tth one of T arrays in the image selector 32. The value t represents the time from time 0 at which the feature test system was made to operate, and t %T represents the remainder resulting from division of t by T. In step S92, the image selector 32 examines the values in the T arrays, sets the values of the input nodes corresponding to numbers existing in the arrays to 1, and sets the values of other input nodes to 0.

In step S93, recurrent neural network 121 of the image selector 32 outputs, from its output layer 133, the value of the image number corresponding to the data input to the input layer 131-1. If the greatest one of the values output from the output nodes of recurrent neural network 121 is equal to or greater than the threshold value, the image selector 32 outputs the corresponding output node number as "ref" to the image display section 33.

After the completion of the feature test process performed as described above in step S73 shown in FIG. 12, the image display section 33 makes the image input section 11 input the image corresponding to the number "ref" supplied from the image selector 32 from the storage unit 5 to the image display section 33 via the control unit 4, and makes the virtual display section displays the image.

That is, images previously formed by the CCD video camera 205 are recorded in the storage unit 5, an image thereafter input by the CCD video camera 205 is recognized, and the image corresponding to the recognized image is read out from the storage unit 5. The image read out from the storage unit 5 may be actually displayed on the LCD 204 if necessary by the image display section 33.

In this embodiment, however, an image in the virtual space is displayed on the LCD 204 while the image input by the CCD video camera 205 is used for detection of the direction of the portable personal computer 200. In this embodiment, when the image display section 33 reads out the image corresponding to the number "ref" from the storage unit 5, it reads out a direction related to the image (which direction is also stored in the storage unit 5 by being) and supplies data of the direction to the server if necessary, receives the corresponding virtual space image data from the server, and displays the corresponding image on the LCD 204.

In step S75, the image shifter 14 copies the image stored in the frame buffer 12 to the frame buffer 13. The process then returns to step S71 to repeat the subsequent processings.

Generally, centroids obtained by moving the CCD video camera 205 on one object image are not generated at random points but selectively generated at particular points. For example, if the object is an image such as shown in FIG. 11, centroids are generated only at points shown as feature points. This means that processing results are not easily affected by changes in the angle of the CCD video camera to the object or in an ambient light condition.

Therefore, the above-described method of categorizing information about peripheral areas about the centroids of differential image portions into labels, characterizing one object image as a set of labels, and performing image learning with respect to the labels (categories) can be used and the amount of processing-object image data can be reduced in comparison with the case where the processing object corresponds to the entire image.

An application of the present invention described below is possible. Scenes in a house are photographed from various points with respect to each of rooms, and images thereby obtained are learnt based on the image processing method of the present invention. The image processing apparatus is operated after being loaded with a medium on which the results of this learning are recorded, thereby enabling a person to recognize one of the rooms observed and a point from which the room is observed. If a personal computer or the like is provided with software and hardware in accordance with the present invention, and if the computer is also provided with an interface such as to enable a particular application program on the personal and a particular image to be related to each other, the application program can be executed in such a condition that the particular image is recognizable.

For example, if the application program is a recipe program and if a picture of a kitchen has been taken, the recipe application can be started by recognizing a corresponding image of the kitchen. If the application program is an audio unit controller, it may be related to a taken picture of equipment including the audio unit. The audio controller can be started by capturing a corresponding image of the audio equipment.

Figure 16:
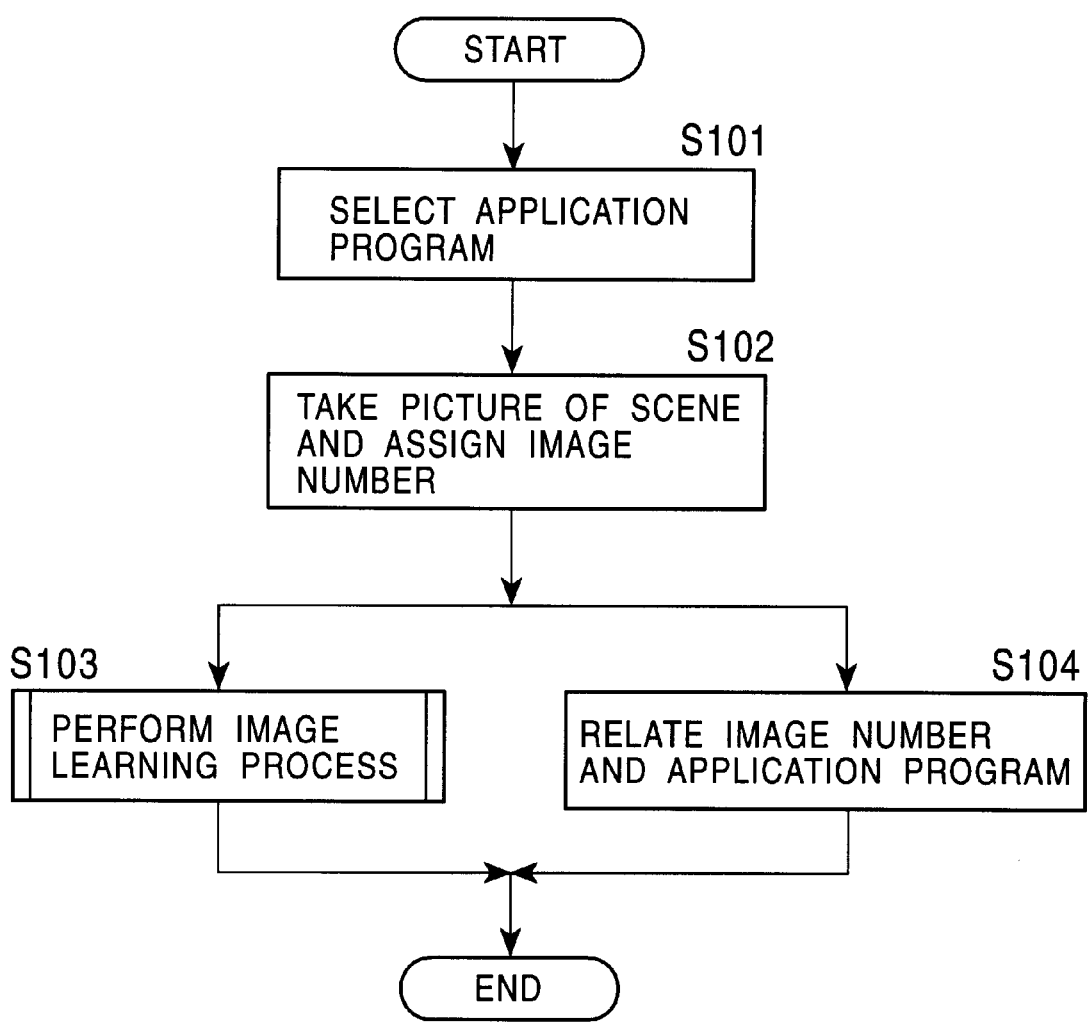
FIG. 16 is a flowchart of the process of relating an application program and taken pictures of a scene.
Figure 17:
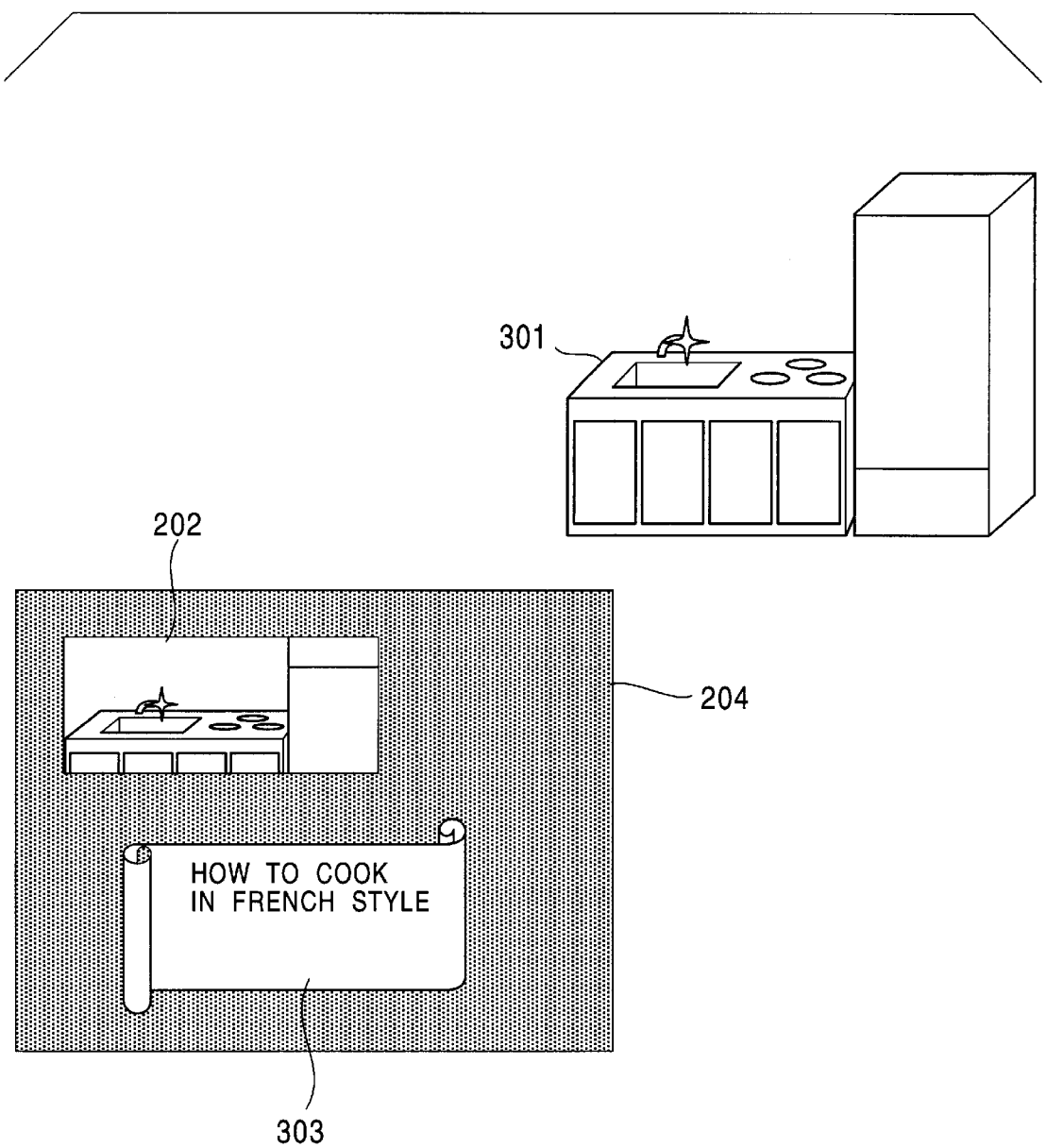
FIG. 17 is a diagram for explaining starting an application program by recognition of a taken picture of a scene.
Figure 18:
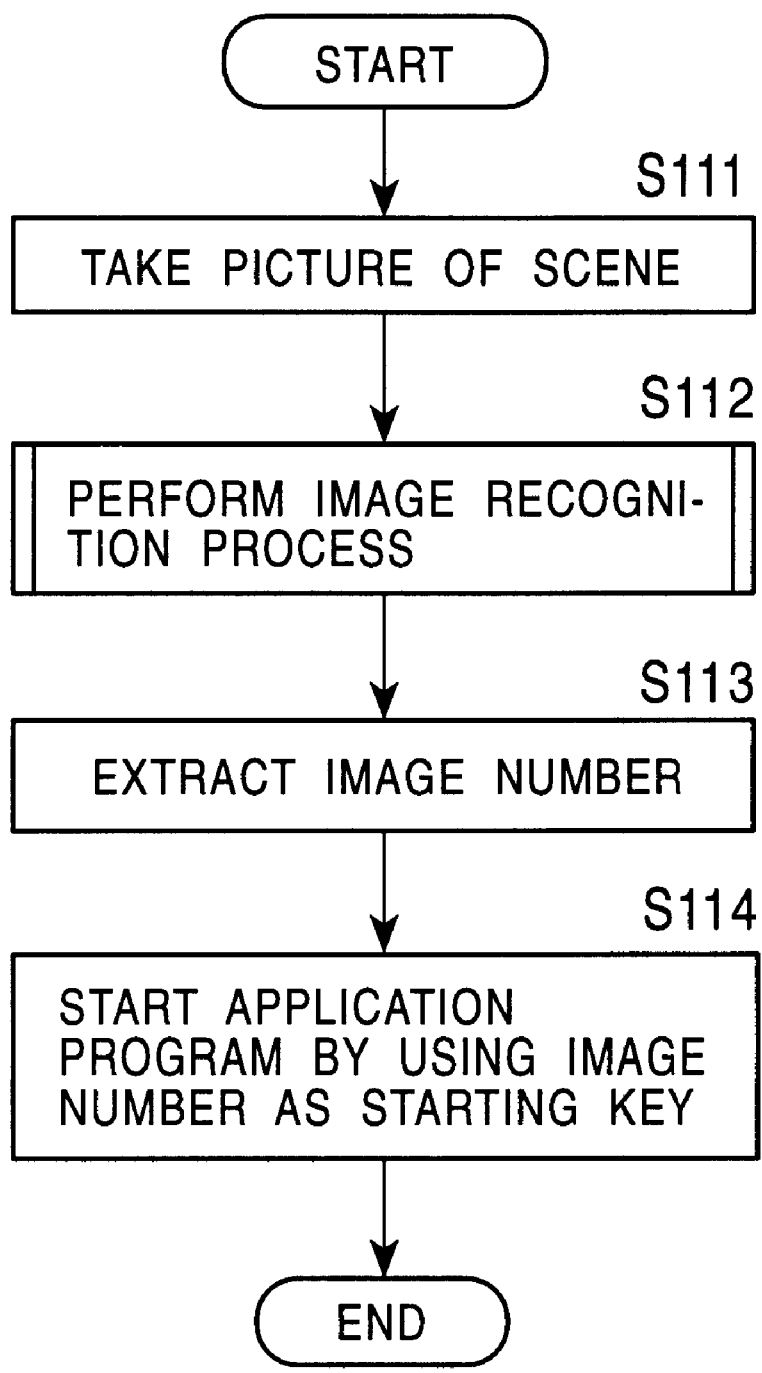
FIG. 18 is a flowchart of the process of starting an application program by recognition of a taken picture of a scene.

An example of an application of the present invention relating to a recipe will be described with reference to FIGS. 16 to 18. FIG. 17 shows an image on the screen of the LCD 204 of the portable personal computer 200 shown in FIG. 15. First, in a learning registration mode, an application program is selected in step S101 shown in FIG. 16. For example, recipe application 303 may be started on the LCD 204 shown in FIG. 17 and selected with a pointing device such as a mouse, or one of usable applications may be selected from a menu on a particular interface. In step S102, a picture of a scene is taken, and a unique image number is assigned thereto. For example, an image of an object 301 with a background, shown in FIG. 17, is formed by the CCD video camera 205 in the apparatus shown in FIG. 15, and a number is assigned to the image. The process then diverges. On one hand, the image learning process in accordance with the present invention is performed in step S103. On the other hand, the image number and the recipe application are entered in a data base in association with each other.

The operation in a recognition mode will be described with reference to FIGS. 17 and 18. First, in step S111 of FIG. 18, a picture of a scene is taken. It is supposed here that the portable personal computer 200, operating as a recognition apparatus, has a function for switching the mode of the portable personal computer 200 into the recognition mode, or that the computer 200 is always in a recognition mode. By taking a picture of object 301 with the CCD camera, an image 302 or the like is obtained from the CCD camera. In step S112, the image recognition process in accordance with the present invention is performed. In step S113, the image number recognized in the image recognition process is extracted. In step S114, the application program, i.e., recipe application 303, is identified and started with the recognized image number used as a starting key.

Figure 19:
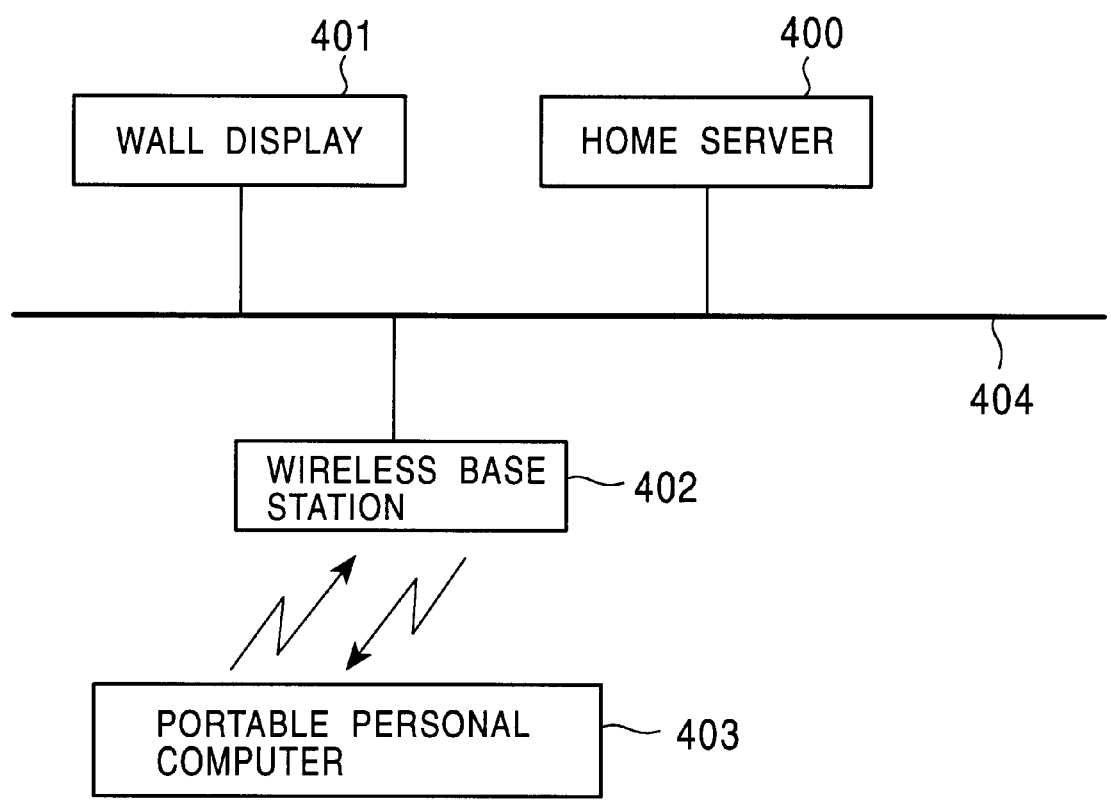
FIG. 19 is a diagram schematically showing a system representing an application of the embodiment of the present invention.

In the above-described example of an application of the present invention, all images, including image 302 from the CCD camera and that of the recipe application, are displayed on the LCD 204. However, such images may be formed by other means. For example, in a system, such as shown in FIG. 19, a recipe application exists on a home server 400 connected to a home network in accordance with IEEE1394 or the like, and is started by designation from a portable personal computer 403 via a wireless base station 402 or the like. Images of the recipe application may be displayed on the portable personal computer 403 or on a wall display 401 placed in a kitchen. While it has been supposed that the portable personal computer is connected to the home network by a radio wave wireless link, it is, of course, possible to connect the portable personal computer by an infrared link or a cable link. While the present invention has been described by supposing use of a portable personal computer such as that shown in FIG. 15, a computer used in accordance with the present invention may be, for example, a wearable computer, i.e., a computer carried on one's person.

According to the present invention, as described above, a category is formed from image data of a peripheral image area about the centroid of a differential image portion detected when one image in a frame is shifted, and image learning is performed by using statistical information processed on the basis of a set of all categories obtained during shifting of the image. Therefore, the image can be learnt in a short time by considering that the image is formed and recognized while the recognition unit is being moved during recognition. Also, according to the present invention, a category is formed from image data of a peripheral image area about the centroid of a differential image portion detected when one image in a frame is shifted, and image recognition is performed by using statistical information processed on the basis of a set of all categories obtained during shifting of the image. Therefore, robust real-time image recognition can be achieved even if an object image is formed and recognized in such a condition that the recognition unit is unstable.

What is claimed is:

1. An image processing apparatus comprising:
   image difference detector means for comparing pixel values of input image data and image data obtained by changing the input image data so that the image represented by the input image data is shifted to generate a differential image;
   computation means for computing a centroid of said differential image between said input image data and said image data obtained by changing the input image data,
   wherein said computation means utilizes the changed pixels and computes the position of said pixel corresponding to the centroid of said changed pixels by computing the arithmetic means of the values of all of said changed pixels obtained by said image difference detector means;
collection means for collecting information of image data of a peripheral area about the centroid obtained by said computation means;
forming means for forming a category from information collected by said collection means and employing a feature learning process that performs plurality-to-one mapping of an image from a plurality of collected feature points of said peripheral areas about a plurality of centroids to form said category; and
learning means for learning a new centroid position in accordance with said information of said category formed by said forming means.

2. An image processing apparatus according to claim 1, further comprising statistical processing means for statistically processing an output from said forming means and for supplying the processed output to said learning means.

3. An image processing apparatus according to claim 1, wherein said forming means comprises a Kohonen network.

4. An image processing apparatus according to claim 1, wherein said collection means forms RGB histogram data and binary data as information of image data of the peripheral area.

5. An information processing apparatus according to claim 1, wherein said learning means comprises a recurrent neural network.

6. An image processing method of processing input image data with an image processing apparatus, said method comprising:
an image difference detector step for comparing pixel values of input image data and image data obtained by changing the input image data so that the image represented by the input image data is shifted to generate a differential image;
a computation step of computing a centroid of said differential image between said input image data and said image data obtained by changing the input image data,
wherein said computation step utilizes the changed pixels and computes the position of said pixel corresponding to the centroid of said changed pixels by computing the arithmetic means of the values of all of said changed pixels obtained by said image difference detector step;
a collection step of collecting information of image data of a peripheral area about the centroid obtained in said computation step;
a forming step of forming a category from information collected in said collection step and employing a feature learning process that performs plurality-to-one mapping of an image from a plurality of collected feature points of said peripheral areas about a plurality of centroids to form said category; and
a learning step of learning a new centroid position in accordance with said information of said category formed in said forming step.

7. An image processing method according to claim 6, further comprising a statistical processing step of statistically processing an output from said forming step and for supplying the processed output to said learning step.

8. An image processing method according to claim 6, wherein said forming step comprises the step of generating an output by a Kohonen network.

9. An image processing method according to claim 6, wherein said collection step comprises the step of forming RGB histogram data and binary data as information of image data of the peripheral area.

10. An information processing method according to claim 6, wherein said learning step comprises the step of performing learning by a recurrent neural network.

11. A provision medium used to provide a program to an image processing apparatus for processing input image data, said apparatus executing a process in accordance with the program, the process comprising:
an image difference detector step for comparing pixel values of input image data and image data obtained by changing the input image data so that the image represented by the input image data is shifted;
a computation step of computing a centroid of said differential image between said input image data and said image data obtained by changing the input image data,
wherein said computation step utilizes the changed pixels and computes the position of said pixel corresponding to the centroid of said changed pixels by computing the arithmetic means of the values of all of said changed pixels obtained by said image difference detector step;
a collection step of collecting information of image data of a peripheral area about the centroid obtained in said computation step;
a forming step of forming a category from information collected in said collection step and employing a feature learning process that performs plurality-to-one mapping of an image from a plurality of collected feature points of said peripheral areas about a plurality of centroids to form said category; and
a learning step of learning a new centroid position in accordance with said information of said category formed in said forming step.

12. A provision medium according to claim 11, wherein the process further comprises a statistical processing step of statistically processing an output from said forming step and for supplying the processed output to said learning step.

13. A provision medium according to claim 11, wherein said forming step comprises the step of generating an output by a Kohonen network.

14. A provision medium according to claim 11, wherein said collection step comprises the step of forming RGB histogram data and binary data as information of image data of the peripheral area.

15. A provision medium according to claim 11, wherein said learning step comprises the step of performing learning by a recurrent neural network.

16. An image processing apparatus comprising:
image difference detector means for comparing pixel values of input image data and image data obtained by changing the input image data so that the image represented by the input image data is shifted;
computation means for computing a centroid of said differential image between said input image data and said image data obtained by changing the input image data,
wherein said computation means utilizes the changed pixels and computes the position of said pixel corresponding to the centroid of said changed pixels by computing the arithmetic means of the values of all of said changed pixels obtained by said image difference detector means;
collection means for collecting information of image data of a peripheral area about the centroid obtained by said computation means;

category selection means for selecting a category from information collected by said collection means and employing a feature learning process that performs plurality-to-one mapping of an image from a plurality of collected feature points of said peripheral areas about a plurality of centroids to form said category;

image selection means for selecting a stored image according to the category selected by said category selection means; and learner means for learning a new centroid position in accordance with said information of said category.

17. An image processing apparatus according to claim 16, wherein said category selection means comprises a Kohonen network.

18. An image processing apparatus according to claim 16, wherein said collection means form RGB histogram data and binary data as information of image data of the peripheral area.

19. An information processing apparatus according to claim 16, wherein said image selection means comprises a recurrent neural network.

20. An image processing method of processing input image data with an image processing apparatus, said method comprising:

an image difference detector step for comparing pixel values of input image data and image data obtained by changing the input image data so that the image represented by the input image data is shifted;

a computation step of computing a centroid of said differential image between said input image data and said image data obtained by changing the input image, wherein said computation step utilizes the changed pixels and computes the position of said pixel corresponding to the centroid of said changed pixels by computing the arithmetic means of the values of all of said changed pixels obtained by said image difference detector step;

a collection step of collecting information of image data of a peripheral area about the centroid obtained in said computation step;

a category selection step of selecting a category from information collected in said collection step and employing a feature learning process that performs plurality-to-one mapping of an image from a plurality of collected feature points of said peripheral areas about a plurality of centroids to form said category;

an image selection step of selecting a stored image according to the category selected in said category selection step; and a learner step for learning a new centroid position in accordance with said information of said category.

21. An image processing method according to claim 20, said category selection step comprises the step of generating an output by a Kohonen network.

22. An image processing method according to claim 20, wherein said collection step comprises the step of forming RGB histogram data and binary data as information of image data of the peripheral area.

23. An information processing method according to claim 20, wherein said image selection step comprises the step of selecting an image by a recurrent neural network.

24. A provision medium used to provide a program to an image processing apparatus for processing input image data, said apparatus executing a process in accordance with the program, the process comprising:

an image difference detector step for comparing pixel values of input image data and image data obtained by changing the input image data so that the image represented by the input image data is shifted;

a computation step of computing a centroid of said differential image between said input image data and said image data obtained by changing the input image data, wherein said computation step utilizes the changed pixels and computes the position of said pixel corresponding to the centroid of said changed pixels by computing the arithmetic means of the values of all of said changed pixels obtained by said image difference detector step;

a collection step of collecting information of image data of a peripheral area about the centroid obtained in said computation step;

a category selection step of selecting a category from information collected in said collection step and employing a feature learning process that performs plurality-to-one mapping of an image from a plurality of collected feature points of said peripheral areas about a plurality of centroids to form said category;

an image selection step of selecting a stored image according to the category selected in said category selection step; and a learner step for learning a new centroid position in accordance with said information of said category.

25. A provision medium according to claim 24, said category selection step comprises the step of generating an output by a Kohonen network.

26. A provision medium according to claim 24, wherein said collection step comprises the step of forming RGB histogram data and binary data as information of image data of the peripheral area.

27. A provision medium according to claim 24, wherein said image selection step comprises the step of selecting an image by a recurrent neural network.

* * * * *